Dec. 18, 1962 C. WOLF 3,068,923

POCKET CARD HOLDING ASSEMBLY

Filed Dec. 5, 1961

INVENTOR.
CHARLES WOLF

BY Albert Sperry
ATTORNEY

United States Patent Office 3,068,923
Patented Dec. 18, 1962

3,068,923
POCKET CARD HOLDING ASSEMBLY
Charles Wolf, 1571 6th St., Trenton, N.J.
Filed Dec. 5, 1961, Ser. No. 157,106
6 Claims. (Cl. 150—35)

This invention relates to pocket type card files and is directed particularly to constructions wherein such a card file is combined with a billfold, purse, wallet or similar construction.

It is usual today for most persons to carry an automobile registration, a driver's license, various credit cards and identification cards, whereas, most fond parents and grandparents carry photographs of youngsters or various members of the family. As a result, it is necessary to carry a card file or holder of some sort which is usually constructed as a part of a wallet, billfold or purse. However, the cards are often placed loosely in a compartment of the wallet since those card holders which are fixed in place within a wallet or card file do not permit ready removal of the cards, pictures or registration. Moreover, the arrangement of card holders in prior card files and billfolds has been such that it is difficult to locate any particular card and practically impossible to remove the card from its holder.

In accordance with the present invention, these objections and limitation of prior card files or holding means are overcome and an improved form of card file is provided which preferably is combined with a billfold, wallet or purse and permits ready location and removal or replacement of any card at any time without disturbing other cards or articles in the assembly. These results are preferably attained by providing a pocket card file with hingedly connected opposite side portions which are yieldably urged toward each other and into a substantially flat, compact form by elastic means. Moreover, the construction is preferably provided with card holding means which are formed to be engaged and held by such elastic means in a manner which serves to retain the cards in place while permitting easy separation and removal of the cards. Further, the assembly is preferably designed so that at least a portion of the card file serves also as a portion of a billfold, purse, wallet or key holder. In this way, an improved type of pocket card file is provided and a combined card file, billfold or the like may be produced economically and in an attractive, compact and convenient form.

Accordingly, one of the principal objects of the present invention is to provide an improved type of card file adapted to receive and hold cards, licenses, photographs and the like while permitting easy location of any particular card in the file.

A further object of the invention is to provide a substantially flat, compact pocket card file with elastic elements and card holding means which are constructed and arranged to hold various cards, photographs or the like in an orderly arrangement within the file while permitting ready removal and return of any individual card.

A particular object of the invention is to provide a combined form of pocket card file and money holder which is neat and attractive in appearance and simple and economical to produce and use.

These and other objects and features of the present invention will appear from the following description thereof in which reference is made to the figures of the accompanying drawings.

Figure 2:
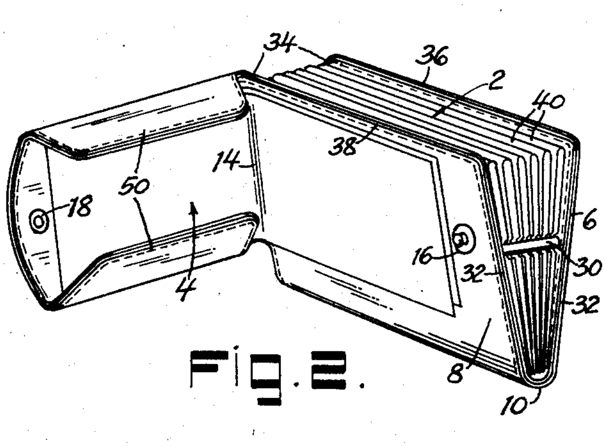
FIG. 2 is a perspective illustrating the card file and billfold produced when using the cover element of FIG. 1.

In that form of the invention chosen for purposes of illustration in FIGS. 1 to 5 of the drawings, the device is in the form of a combination pocket card file and billfold wherein the card file is indicated generally at 2, whereas the billfold is indicated generally at 4. An assembly of this type can be readily produced when using a cover element such as that shown in FIG. 1. This element embodies a card file side portion 6 and an opposite card file side portion 8 hingedly connected together at 10. A billfold portion 12 extends laterally from the card file side portion 8 of the elements shown in FIG. 1 and is hingedly connected thereto along the line 14. Thus, the combined card file and billfold can be formed of a single piece of material which is generally L-shaped in form. Snap fastening means or the like can be connected to the cover element as indicated at 16 and 18 whereby the element of FIG. 1 can be formed into the combined card holder and billfold as shown in FIG. 2, whereas it is extremely simple and economical to produce and convenient to use.

Figure 3:
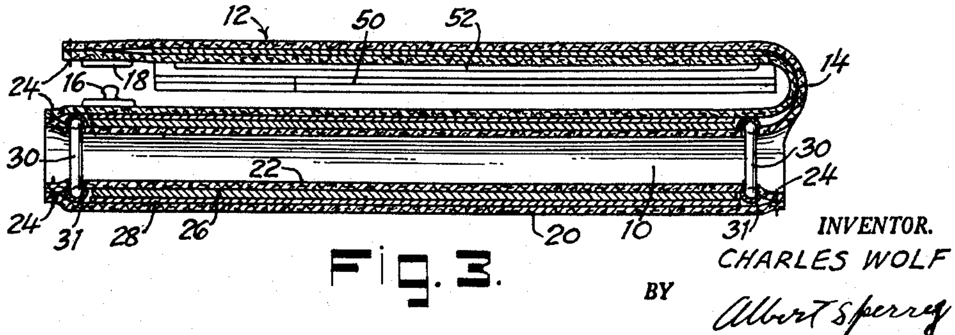
FIG. 3 is a vertical sectional view through the card file and billfold of FIG. 2 as seen in its closed arrangement.

Ordinarily, as shown in FIG. 3, constructions of this type are formed with an outer layer of material 20 which may consist of leather, plastic or other decorative and wear-resisting material and a cooperating inner layer of material 22 which is secured to the layer of material 20 by stitching 24 or otherwise. Furthermore, the side portions 6 and 8 of the card file 2 of the assembly are preferably reinforced by stiff cards or sheets of material such as cardboard, light metal or the like as indicated at 26. In addition, a layer of padding or cushioning material 28 may be located between the stiffening members 26 of the outer covering member layer 20 so as to afford a luxurious and wear-resisting feel and appearance to the combined card file and billfold. However, it will be apparent that the assembly may be constructed and formed in any other suitable or preferred manner and when employing fabric, leather, plastic or any other suitable or preferred materials.

Figure 1:
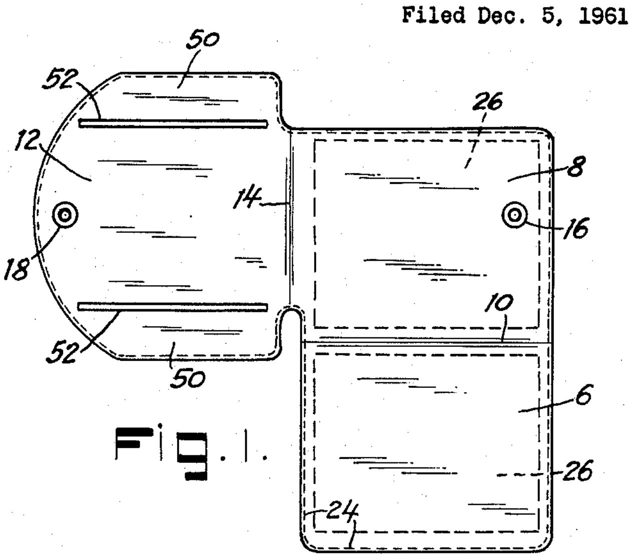
FIG. 1 is a plan view of a typical and preferred form of cover element which may be employed in forming a card file and billfold in accordance with the present invention.
Figure 4:
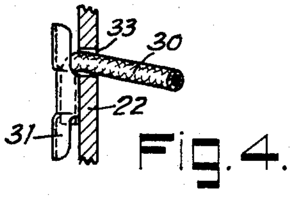
FIG. 4 is a detail illustrating a typical form of elastic means which may be employed in the practice of the present invention.
Figure 5:
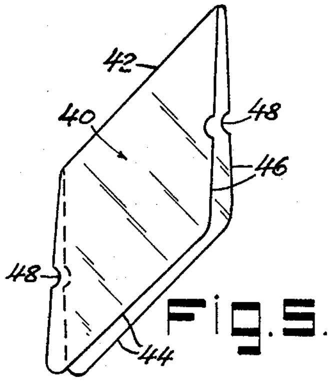
FIG. 5 is a perspective showing one of the card holders employed in the card file of FIG. 2.

In order to attain the desired advantages of the pocket card file portion of the assembly, elastic means are provided for urging the opposite side portions 6 and 8 of the card file toward each other whereby the cards located in the card file portion of the assembly will be pressed together and held in a flat convenient arrangement permitting the card file to be carried in the pocket and to be characterized by a large capacity with a minimum bulk. As shown in FIGS. 2, 3 and 4, the elastic means employed preferably consist of the bands or strands of elastic material 30 which extend from the side portion 6 to the side portion 8 of the pocket card file and are located adjacent the side edges 32 and 34 of the side portions at a substantial distance from the hinge connection 10 about which the side portions 6 and 8 are movable. As shown in FIG. 2, the elastic members 30 are positioned substantially midway between the hinge connection 10 and the outer free edges 36 and 38 of the card file portion of the assembly. However, the elastics 30 may be positioned nearer the free edges 36 and 38 of the card file portion or at other locations which will serve to urge the side portions 6 and 8 of the card file toward each other and into a substantially flat folded condition.

As shown in FIG. 3, the elastic means 30 may conveniently be secured to the side portions 6 and 8 of the card file of the assembly by means of a metal or other stiff tip element 31 designed to be inserted through a small opening 33 in the inner layer of cover material 22 and into the space between the inner and outer layers 20 and 22 of cover material. The tip 31 is connected to the elastic means 31 in a manner of a toggle or T-shaped connection whereby after insertion through the opening 33, the ends of the tip will project laterally beyond the opening 33 and prevent withdrawal of the elastic means from the side portions 6 and 8. The elastic means 30 are, thus, held securely in place while permitting easy insertion thereof. Of course, if desired, the elastic means 30 may be connected to the side portions 6 and 8 of the card file in any other suitable or preferred manner.

The pocket card file thus provided may be used with loose cards or other information carrying means or members and will serve to hold them in place by reason of the action of elastic means 30 in pressing and holding the cards together. However, in the preferred form of the present invention, the card file is provided with a plurality of card holding members 40 such as those shown in FIG. 5 which may be formed of thin transparent material such as cellophane or the like creased to present a folded edge 42 and free edges 44. The opposite end edges 46 of the folder 40 are then provided with notches 48 which are arranged to register with and be engaged by the elastic means 30 which extends from the side portion 6 to the side portion 8 of the card file assembly.

The card holders 40 are of a size adapted to fit within the card file portion 2 of the assembly with the end edges 46 and the folded or creased edge 42 of the folders spaced slightly inward from the free edges 32, 34, 36 and 38 of the card file. Any desired number of the card holders 40 can be inserted between the side portions 6 and 8 of the card file and they will be securely held in place by the elastic means 30. On the other hand, the hinged connection 10 between the side portions 6 and 8 of the card file permit the card file to be opened readily as when opening a book so that each individual card or picture can be inspected and identified to select the particular card or photograph needed on any occasion. The notches 48 in the ends 46 of the card holders remain in engagement with the elastics 30 when the card file is thus opened so that none of the cards will be lost or fall from the card file accidentally. On the other hand, the edges of the notches 48 preferably are rounded or sloped so that when a particular card has been located, it can be readily pulled out for complete removal from the card file due to the yielding action of the elastic means 30. Thereafter, when it is desired to return the card and its holder to the card file, the elastic means will yield sufficiently to permit easy insertion and return of the removed card holder without disturbing or removing other cards in the file.

The billfold extension 12 of the assembly is pivotally connected at 14 to the portion 8 of the card file so that it may be folded over the outer face of the card file to cooperate therewith in forming a convenient holder for paper money, checks and the like. The portion 12 preferably is provided with laterally extending wings or parts 50 which are designed to be folded inward to engage and hold bills, checks and the like so that they will be retained in place. For this purpose, if desired, the outer layer of covering material 20 which forms the inner surface of the billfold portion of the assembly may be provided with slits, scoring or lines of weakness as indicated at 52 to permit inward folding of the extensions 50 in a manner which will enable them to remain in their intended positions to hold the bills, checks or the like in the billfold portion of the assembly. Of course, the billfold will normally be held in the cosed position of FIG. 3 so as to retain the money therein by means of the snap fastening elements 16 and 18 or other releasable connections employed.

It will thus be apparent that the card file may be used independently of the billfold and without exposing the contents of the billfold. At the same time, the billfold may be opened and used without disturbing or danger of misplacing the cards carried by the card file portion of the assembly. Nevertheless, the whole assembly can be fabricated easily and inexpensively so as to produce an attractive and useful combination which is small and compact and which normally and inherently tends to remain in a closed and flattened form by reason of the action of the elastic means which draw the side portions of the card file and the billfold itself toward each other and into a compressed arrangement.

Figure 6:
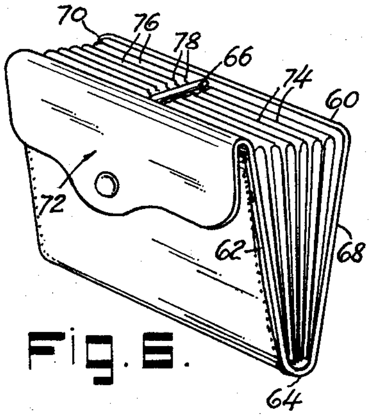
FIG. 6 is a perspective illustrating an alternative construction embodying the present invention.

While the construction shown and described in FIGS. 1 to 5 of the drawings is preferred, the invention may be embodied in numerous other forms and types of assemblies as exemplified by FIG. 6. As there shown, the billfold portion of the assembly has the side portions 60 and 62 which are pivotally connected at 64 whereas, their free edges are urged toward each other by the elastic means 66 located midway between the opposite ends 68 and 70 of the side portions of the card file. The side portion 62 of the card file may be provided with a pocket, change purse or key holding construction 72 of any conventional or preferred form. In such an assembly, the card holders 74 located in the card file portion of the assembly may be provided with folded edges 76 and notches 78 positioned midway between the ends of the folded edges 70 of the card holders 74. This construction permits ready opening and inspection of the various cards in the card file as in the previous form of the invention, whereas the card holders can be inserted and removed endwise between the side portions 60 and 62 of the card file. Nevertheless, the card holders are held in place in essentially the same manner as when employing that form of the invention shown in FIG. 2.

It will thus be apparent that the present invention is capable of being employed in various alternative combinations and arrangements so as to afford the maximum card carrying capacity with a minimum of bulk in the assembly. Furthermore, the construction lends itself to numerous alternative assemblies and combinations or arrangements of elements so that the invention is extremely versatile in its application. For the foregoing reasons, it should be understood that the particular embodiments of the invention shown in the drawings and described above are intended to be illustrative only and are not intended to limit the scope of the invention.

I claim:

1. A pocket card case comprising two substantially rectangular side portions hingedly connected together along one edge thereof, two elastic strips of material extending between said side portions of the card case and connected thereto at points spaced from the hingedly connected edges of the side portions and adjacent two other and oppositely disposed edges of the side portions of the card case, said elastic strips of material urging said side portions of the card case toward parallel positions, a plurality of card holders each presenting two side faces having substantially the same rectangular shape as the side portions of the card case but somewhat smaller in size than said side portions, said side faces of the card holders being connected together along one edge of the card holder, two other and oppositely disposed edges of the face portions of the card holders each having a notch therein corresponding in location to the location of one of said elastic strips of material and engagable thereby to retain the card holders in place between the side portions of said card case, said card holders being removable from and replaceable between the face portions of the card holder upon flexing of said elastic strips of material.

2. A pocket card case as defined in claim 1 wherein the card holder is formed of transparent material.

3. A pocket card case as defined in claim 1 wherein means are secured to one of the side portions of the card case and overlie the outer face of said side portion in position to cooperate therewith in defining a receptacle for money.

4. A pocket card case as defined in claim 1 wherein at least one of the side portions of the card case consists of an L-shaped piece of material having one of the projecting portions thereof folded to form an edge of said side portion with said projecting portion overlying the outer surface of the side portion and cooperating therewith to form a money holder.

5. A pocket card case comprising two substantially rectangular side portions hingedly connected together along one edge thereof, an elastic strip of material connected to each of said side portions at a point spaced from the hingedly connected edges of the side portions of the card case and urging said side portions toward parallel positions, a plurality of card holders each having substantially the same rectangular shape as the side portions of the card case but somewhat smaller in size than said side portions, said card holders each presenting opposite face portions connected together along one edge, said card holder also having a notch formed in one edge thereof corresponding in location to the location of said elastic strip of material and engageable thereby to retain the card holders in place between the side portions of said card case, said card holders being removable from and replaceable between the side portions of the card holder upon flexing of said elastic strip of material to disengage said notch, and means secured to one of the side portions of the card case and overyling the outer face of the latter side portion in position to cooperate therewith in defining a receptacle for money.

6. A pocket card case comprising two substantially rectangular side portions hingedly connected together along one edge thereof, an elastic strip of material connected to each of said side portions at a point spaced from the hingedly connected edges of the side portions of the card case and urging said side portions toward parallel positions, a plurality of card holders each having substantially the same rectangular shape as the side portions of the card case but somewhat smaller in size than said side portions, said card holders each presenting opposite face portions connected together along one edge, said card holder also having a notch formed in one edge thereof corresponding in location to the location of said elastic strip of material and engageable thereby to retain the card holders in place between the side portions of said card case, said card holders being removable from and replaceable between the side portions of the card holder upon flexing of said elastic strip of material to disengage said notch, at least one of the side portions of the card case consisting of an L-shaped piece of material having one of the projecting portions thereof folded to form an edge of said side portion with said projecting portion overlying the outer surface of the side portion and cooperating therewith to form a money holder.

References Cited in the file of this patent

UNITED STATES PATENTS

| | | |
|---|---|---|
| 2,318,677 | Delson | May 11, 1943 |
| 2,422,432 | Miller | June 17, 1947 |
| 2,557,523 | Victor | June 19, 1951 |
| 2,607,351 | Allison | Aug. 19, 1952 |